(12) United States Patent
Chang et al.

(10) Patent No.: US 11,868,008 B2
(45) Date of Patent: Jan. 9, 2024

(54) DISPLAY APPARATUS AND ELECTRONIC DEVICE

(71) Applicant: HUAWEI TECHNOLOGIES CO., LTD., Guangdong (CN)

(72) Inventors: Yiwen Chang, Dongguan (CN); Chenxiang Zhao, Shenzhen (CN); Kang Chung Liu, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 18/158,000

(22) Filed: Jan. 23, 2023

(65) Prior Publication Data
US 2023/0161198 A1  May 25, 2023

Related U.S. Application Data

(63) Continuation of application No. PCT/CN2021/104887, filed on Jul. 7, 2021.

(30) Foreign Application Priority Data

Jul. 31, 2020  (CN) .......................... 202010763098.1
Aug. 11, 2020  (CN) .......................... 202010800927.9

(51) Int. Cl.
*G02F 1/133* (2006.01)
*G02F 1/13357* (2006.01)
(Continued)

(52) U.S. Cl.
CPC ....... *G02F 1/13362* (2013.01); *G02B 6/0056* (2013.01); *G02F 1/13312* (2021.01);
(Continued)

(58) Field of Classification Search
CPC ........... G02F 1/133606; G02F 1/13362; G02B 6/0056
(Continued)

(56) References Cited

U.S. PATENT DOCUMENTS 7,495,719 B2 * 2/2009 Adachi ............. G02F 1/133536
349/96
11,686,971 B2 * 6/2023 Zhao ................. G02F 1/133504
349/96
(Continued)

FOREIGN PATENT DOCUMENTS

CN  101369067 A  *  2/2009
CN  116088216 A  *  5/2023
KR   2400334 B1  *  5/2022  ............. G02B 26/02

*Primary Examiner* — Christopher M Raabe
(74) *Attorney, Agent, or Firm* — WOMBLE BOND DICKINSON (US) LLP (57) ABSTRACT

A display apparatus includes a backlight component, a light adjusting component, a display panel, and a first polarizing film. The backlight component is configured to generate polarized light. The light adjusting component is disposed on one side of the backlight component, and is configured to deflect or not deflect polarized light generated by the backlight component. The first polarizing film is disposed between the light adjusting component and the display panel. In the display apparatus) provided in this application, when the polarized light obtained after passing through the light adjusting component passes through the first polarizing film, if a vibration direction of the polarized light is consistent with a transmission direction of the first polarizing film, the polarized light can be transmitted. If the vibration direction of the polarized light is perpendicular to the transmission direction of the first polarizing film, the polarized light cannot be transmitted.

20 Claims, 8 Drawing Sheets

(51) Int. Cl.
  *G02F 1/1333* (2006.01)
  *F21V 8/00* (2006.01)
(52) U.S. Cl.
  CPC ........ *G02F 1/133368* (2021.01); *G02B 6/005* (2013.01); *G02F 1/133603* (2013.01); *G02F 1/133606* (2013.01)
(58) Field of Classification Search
  USPC .......................................................... 349/33
  See application file for complete search history.

(56) References Cited

U.S. PATENT DOCUMENTS

| | | | |
|---|---|---|---|
| 2016/0216540 A1* | 7/2016 | Cho | .................... G02F 1/13471 |
| 2019/0129213 A1 | 5/2019 | Cho et al. | |
| 2019/0331945 A1 | 10/2019 | Fang et al. | |
| 2021/0341790 A1* | 11/2021 | Meng | ................ G02F 1/133605 |
| 2023/0258976 A1* | 8/2023 | Chang | .................... G02B 27/28 |
| | | | 349/96 |

* cited by examiner

DISPLAY APPARATUS AND ELECTRONIC DEVICE

CROSS-REFERENCE TO RELATED APPLICATIONS

This application is a continuation of International Application No. PCT/CN2021/104887, filed on Jul. 7, 2021, which claims priority to Chinese Patent Application No. 202010763098.1 filed on Jul. 31, 2020 and Chinese Patent Application No. 202010800927.9 filed on Aug. 11, 2020. All of the aforementioned patent applications are hereby incorporated by reference in their entireties.

TECHNICAL FIELD

This application relates to the field of display technologies, and in particular, to a display apparatus and an electronic device.

BACKGROUND

As a liquid crystal display (LCD) is widely applied, usage scenarios of the liquid crystal display are increasingly diversified. In different usage scenarios, users also have different requirements on a display effect of the liquid crystal display. For example, in some usage scenarios, the liquid crystal display is required to have relatively high contrast performance, that is, a ratio of brightness of the liquid crystal display in a full-white screen state to that in a full-black screen state. However, as limited by a backlight display principle of the liquid crystal display, as well as a liquid crystal material in a liquid crystal display panel and a driving manner, contrast performance of some liquid crystal displays can reach only 1500. To improve a contrast of the liquid crystal display, some manufacturers begin to improve a backlight module in the liquid crystal display. For example, a direct-type backlight design may be used. The backlight module is disposed on a back of the liquid crystal display panel, and a quantity of light sources used in the backlight module is increased, so that the backlight module can adjust brightness of some areas based on content of a displayed picture, to assist the liquid crystal display panel in achieving a dark state effect with lower brightness and a bright state effect with higher brightness, thereby improving an overall contrast of the liquid crystal display. However, when a relatively small quantity of light sources are configured in the backlight module, high-precision brightness adjustment cannot be implemented. Therefore, the display effect of the liquid crystal display is affected. When a relatively small of light sources are configured in the backlight module, manufacturing costs and an overall weight of the liquid crystal display are significantly increased to achieve good bright and dark display effects.

SUMMARY

This application provides a display apparatus that helps to improve a display effect of a display panel and is easily manufactured, and an electronic device.

According to one aspect, this application provides a display apparatus, including a backlight component, a light adjusting component, a display panel, and a first polarizing film. The backlight component is configured to generate polarized light, so that a light source for displaying an image may be provided to the display panel. The light adjusting component is disposed on a side of the backlight component, and configured to deflect or not deflect the polarized light generated by the backlight component. The first polarizing film is disposed between the light adjusting component and the display panel, and configured to transmit polarized light whose vibration direction is the same as a transmission direction of the first polarizing film. In the display apparatus provided in this application, the polarized light generated by the backlight component first needs to pass through the light adjusting component. After passing through the light adjusting component, the polarized light may be directly transmitted in an original vibration direction if the light adjusting component does not deflect the polarized light. Alternatively, the polarized light may be transmitted after the vibration direction of the polarized light is deflected by the light adjusting component. When the polarized light after the light adjusting component passes through the first polarizing film, if the vibration direction of the polarized light is consistent with the transmission direction of the first polarizing film, the polarized light can be transmitted. In this case, the display panel can receive light with relatively high light intensity, so that a picture with a good bright state effect can be displayed. If the vibration direction of the polarized light and the transmission direction of the first polarizing film are perpendicular to each other, the polarized light cannot be transmitted. In this case, the display panel cannot receive effective light, so that a picture with a good black state effect can be displayed.

In an embodiment, the light adjusting component may include a first substrate, a second substrate, a liquid crystal layer, and a driving circuit. Specifically, the first substrate is disposed opposite to the second substrate, the liquid crystal layer is disposed between the first substrate and the second substrate, and the driving circuit is disposed on the first substrate, and configured to drive deflection of liquid crystals in the liquid crystal layer to deflect the vibration direction of the polarized light. During specific configuration, the driving circuit may include a thin film transistor, a storage capacitor, and the like. It may be understood that, "the driving circuit is disposed on the first substrate and/or the second substrate" means that the driving circuit may be disposed on the first substrate or the second substrate, or may be disposed on both the first substrate and the second substrate.

In an embodiment, the first substrate and the second substrate may be made of a soft material. For example, the first substrate and the second substrate may be made of colorless polyimide (CPI) to effectively prevent a phenomenon such as moire, while effectively reducing a weight of the light adjusting component. It may be understood that, in another implementation, the first substrate and the second substrate may alternatively be made of glass, polyimide (polyimide, PI), tricarboxylic acid cycle (tricarboxylic acid cycle, TAC), polycarbonate (Polycarbonate, PC), polyethylene terephthalate (polyethylene terephthalate, PET), or materials with a low optical phase retardation (such as Rth<300 nm).

In addition, the first substrate and the second substrate may use a same material or different materials.

For example, the first substrate and the second substrate may be made of materials with different refractive indices, to improve light transmittance of the light adjusting component.

Alternatively, roughness processing may be performed on a surface of the first substrate. For example, a protrusion or a groove may be disposed on a surface that is of the first substrate and that is away from the liquid crystal layer, to improve the light transmittance of the light adjusting component, while effectively preventing a phenomenon such as moire. Alternatively, an antireflection film may be disposed on the surface that is of the first substrate and that is away from the liquid crystal layer, to improve the light transmittance of the light adjusting component.

In another embodiment, any one of the protrusion, the groove, or the antireflection film may be disposed on a surface (e.g., an upper surface in the figure) that is of the second substrate and that is away from the liquid crystal layer. Alternatively, the protrusion, the groove, or the antireflection film may be disposed on both the first substrate and the second substrate.

In some other embodiments, to prevent an undesirable phenomenon such as moire, a diffusion film may be further disposed between the display panel and the light adjusting component. The diffusion film can improve field-of-view distribution of the polarized light, while effectively maintaining the original vibration direction of the polarized light. For example, the diffusion film can increase a field of view of the polarized light by more than 10°, and can maintain the vibration direction of the polarized light at more than 90%.

In an embodiment, the diffusion film may be disposed between the first polarizing film and the first substrate, or may be disposed between the first polarizing film and a fourth substrate. In addition, the diffusion film may be made of a material such as polycarbonate or polyimide, and a thickness of the diffusion film may be adaptively adjusted based on an actual situation. This is not limited in this application.

In addition, in an embodiment, to implement a function such as human-machine interaction, a photoelectric element is further disposed in the light adjusting component. When an external light source (such as an infrared laser pen used by a user) irradiates the display apparatus, the external light source is transmitted to the light adjusting component through the display panel and the first polarizing film. After the photoelectric element senses the external light source, a specific irradiation position of the external light source may be determined, to achieve the objective of human-machine interaction. In an embodiment, one or more photoelectric elements may be disposed in each light adjusting unit of the light adjusting component, to effectively improve precision of the irradiation position of the external light source.

In an embodiment, the photoelectric element may be disposed on the first substrate or the second substrate, or may be disposed on both the first substrate and the second substrate. The photoelectric element may be a photosensitive resistor, a photosensitive diode, a photosensitive triple laser, or the like.

When the display panel is configured, the display panel may include a panel body and a second polarizing film. The panel body includes a third substrate, a fourth substrate, a liquid crystal layer, a color filter, and a driving circuit. Specifically, the third substrate is disposed opposite to the fourth substrate, the liquid crystal layer is disposed between the third substrate and the fourth substrate, and the driving circuit is disposed on the third substrate, and configured to drive deflection of liquid crystals in the liquid crystal layer to deflect the vibration direction of the polarized light. In an embodiment, the driving circuit may include a thin film transistor, a storage capacitor, and the like. It may be understood that, the driving circuit may be disposed on the third substrate or the fourth substrate, or may be disposed on both the third substrate and the fourth substrate.

The color filter is disposed on the third substrate, and after the polarized light passes through the liquid crystal layer, the color filter filters the light, so that the display panel displays a color picture. Alternatively, the color filter may be disposed on the fourth substrate.

The second polarizing film is disposed on a surface that is of the third substrate and that is away from the liquid crystal layer, and configured to transmit polarized light whose vibration direction is consistent with a transmission direction of the second polarizing film.

In addition, a plurality of pixel units may be configured in the display panel. A quantity of configured pixel units may be adaptively selected and adjusted based on an actual requirement. For example, the quantity of pixel units may be configured to 1920*1080. Correspondingly, to enable the light adjusting component to effectively adjust an amount of light entering each pixel unit, 1920*1080 light adjusting units may be configured in the light adjusting component. That is, the plurality of light adjusting units are disposed in one-to-one correspondence with the plurality of pixel units, and each light adjusting unit may actively adjust light transmitted to a corresponding pixel unit, to effectively control an amount of light entering the pixel unit.

Alternatively, in some other embodiments, a quantity of configured light adjusting units may be less than a quantity of configured pixel units. That is, a single light adjusting unit may be configured corresponding to a plurality of pixel units. Alternatively, it may be understood that a plurality of pixel units may be disposed in an area corresponding to a single light adjusting unit, so that the single light adjusting unit can effectively control an amount of light entering the plurality of corresponding pixel units.

In addition, the light adjusting component may further perform uniformization processing on the light of the backlight component, to improve a display effect of the display apparatus.

For example, a plurality of backlight units may be disposed in the backlight component, and at least one point light source may be disposed in each backlight unit. A quantity of backlight units may be less than a quantity of configured light adjusting units. Light emitted by the point light source is not uniform, that is, light intensity at a center position of the point light source is higher, while light intensity in a peripheral area of the point light source is weaker. Therefore, to enable the display panel to receive an area light source with uniform light intensity, the light adjusting component may perform different deflection processing on polarized light in an area with stronger light and an area with weaker light, so that the polarized light transmitted through the first polarizing film has uniform light intensity.

According to another aspect, this application further provides an electronic device, including a housing and the foregoing display apparatus. The display apparatus is installed in the housing. Specifically, "the display apparatus is installed in the housing" may be as follows: The housing may be provided with an accommodation groove for fixedly installing the display apparatus. After the display apparatus is fixedly installed in the accommodation groove, the display panel can be exposed out of an outer surface of the housing. During specific implementation, the electronic device may be a display, a television, a mobile phone, a notebook computer, a smart watch, or the like.

DESCRIPTION OF EMBODIMENTS

To make objectives, technical solutions, and advantages of this application clearer, the following further describes this application in detail with reference to the accompanying drawings.

To facilitate understanding of a display apparatus provided in embodiments of this application, the following first describes an application scenario of the display apparatus.

The display apparatus provided in embodiments of this application may be applied to an electronic device such as a display, a mobile phone, a notebook computer, or a smart watch, and configured to display information such as a text or a picture, or respond to an operation such as touch or slide of a user, to achieve an objective of human-machine interaction.

In an embodiment, a widely used display apparatus mainly includes a liquid crystal display (LCD). The liquid crystal display mainly includes a liquid crystal panel and a backlight. Under an action of an applied electric field, arrangement directions of liquid crystal molecules are changed to change light transmittance of the backlight, thereby transmitting different brightness to display an image. However, in an actual use process, the LCD cannot effectively allow for both bright and dark pictures. For example, in a displayed image, pictures of some areas need to reflect relatively high brightness (such as a white picture), and pictures of other areas need to reflect relatively low brightness (such as a black picture). However, in actual application, the liquid crystal display cannot effectively suppress an area with relatively low picture brightness, thereby failing to achieve a desirable black state effect. Therefore, it is difficult to effectively improve a contrast of the liquid crystal display.

Based on the foregoing problem of a current display apparatus, embodiments of this application provide a display apparatus that can help to improve a contrast.

To make objectives, technical solutions, and advantages of this application clearer, the following further describes this application in detail with reference to the accompanying drawings.

Terms used in the following embodiments are merely intended to describe particular embodiments, but are not intended to limit this application. The terms "one", "a", "the foregoing", and "the one" of singular forms used in this specification and the appended claims of this application are also intended to include expressions such as "one or more", unless otherwise specified in the context clearly. It should be further understood that in the following embodiments of this application, "at least one" and "one or more" refer to one, two, or more. "And/or" describes an association relationship between associated objects, and represents that three relationships may exist. For example, A and/or B may represent the following cases: Only A exists, both A and B exist, and only B exists, where A and B may be singular or plural. The character "/" usually indicates an "or" relationship between associated objects.

Reference to "an embodiment", "some embodiments", or the like described in this specification means that one or more embodiments of this application include a specific feature, structure, or characteristic described with reference to the embodiment. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

To facilitate understanding of the technical solutions of this application, the following first briefly describes characteristics of polarized light.

Light is a transverse wave, and natural light (such as light emitted by common light sources such as the sun and electric lamps) contains light that vibrates in all directions perpendicular to a propagation direction. A process of converting natural light into polarized light is referred to as polarization, and an optical component used for the conversion is referred to as a polarizer (such as a polarizing film). After the natural light passes through the polarizer, only light whose vibration direction is consistent with a transmission direction of the polarizer can pass. That is, the light passing through the polarizer vibrates only in a particular direction. The light is referred to as polarized light. When the polarized light passes through an analyzer (such as a polarizing film), if the vibration direction of the polarized light is consistent with a transmission direction of the analyzer, the polarized light can pass. If the vibration direction of the polarized light and the transmission direction of the analyzer are perpendicular to each other, the polarized light cannot pass. If the vibration direction of the polarized light and the transmission direction of the analyzer are set at an angle (between 0° and 90°), a part of the polarized light can pass. Transmittance of the polarized light depends on a magnitude of the angle. That is, a smaller angle between the vibration direction of the polarized light and the transmission direction of the analyzer indicates larger transmittance of the polarized light; otherwise, the transmittance is smaller.

The display apparatus provided in embodiments of this application displays relatively low dark state brightness based on the foregoing characteristics of polarized light, to improve a contrast.

Figure 1:
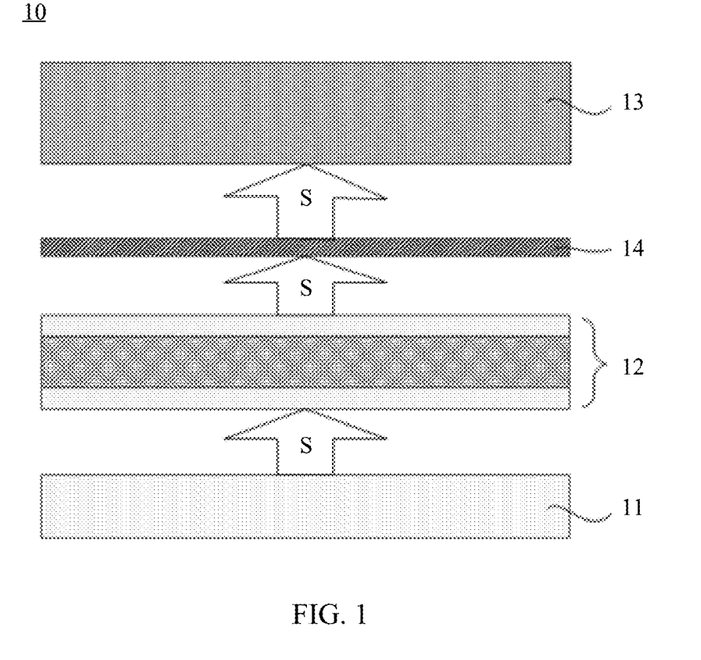
FIG. 1 is a schematic diagram of a cross-sectional structure of a display apparatus according to an embodiment of this application.

As shown in FIG. 1, a display apparatus 10 provided in an embodiment of this application includes a backlight component 11, a light adjusting component 12, a display panel 13, and a first polarizing film 14. The backlight component 11 is configured to generate polarized light, so that light for displaying an image may be provided to the display panel 13. The light adjusting component 12 is disposed on a side of the backlight component 11, and configured to deflect or not deflect a vibration direction of the polarized light generated by the backlight component 11. The first polarizing film 14 is disposed between the light adjusting component 12 and the display panel 13, and configured to transmit polarized light whose vibration direction is the same as a transmission direction of the first polarizing film.

Specifically, the polarized light generated by the backlight component 11 first needs to pass through the light adjusting component 12. After passing through the light adjusting component 12, the polarized light may be directly transmitted in an original vibration direction if the light adjusting component 12 does not deflect the polarized light. Alternatively, the polarized light may be transmitted after the vibration direction of the polarized light is deflected by the light adjusting component 12. When the polarized light after the light adjusting component 12 passes through the first polarizing film 14, if the vibration direction of the polarized light is consistent with the transmission direction of the first polarizing film 14, the polarized light can be transmitted. In this case, the display panel 13 can receive light with relatively high light intensity, so that a picture with a good bright state effect can be displayed. If the vibration direction of the polarized light and the transmission direction of the first polarizing film 14 are perpendicular to each other, the polarized light cannot be transmitted. In this case, the display panel 13 cannot receive effective light, so that a picture with a good black state effect can be displayed.

For example, as shown in FIG. 1, when the polarized light generated by the backlight component 11 is polarized light S, and the transmission direction of the first polarizing film 14 is consistent with a vibration direction of the polarized light S, if the light adjusting component 12 does not deflect the vibration direction of the polarized light S, the display panel 13 can receive light with relatively high light intensity.

Figure 2:
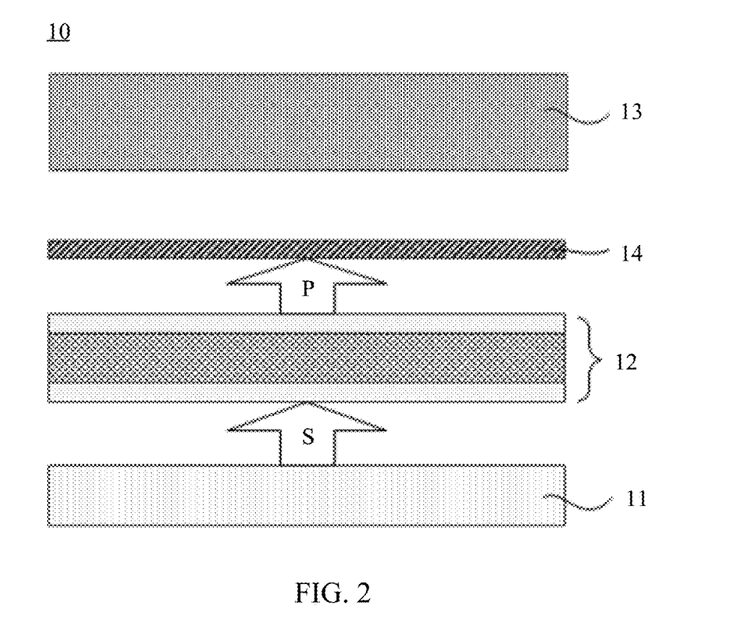
FIG. 2 is a schematic diagram of a cross-sectional structure of a display apparatus according to an embodiment of this application.

As shown in FIG. 2, vibration directions of polarized light S and polarized light P are perpendicular to each other. When the polarized light generated by the backlight component 11 is the polarized light S, and the transmission direction of the first polarizing film 14 is consistent with the vibration direction of the polarized light S, if the light adjusting component 12 deflects the vibration direction of the polarized light S by 90° (that is, the light adjusting component 12 converts the polarized light S into the polarized light P), when the polarized light P passes through the first polarizing film 14, because the transmission direction of the first polarizing film 14 and the vibration direction of the polarized light S are perpendicular to each other, the polarized light P is blocked by the first polarizing film 14, and the display panel 13 cannot receive effective light, so that the display panel 13 can display a picture having a good black state effect.

In an embodiment, a plurality of light adjusting units may be disposed in the light adjusting component 12, and each light adjusting unit may independently adjust a vibration direction of polarized light, referring to FIG. 3 to FIG. 6 in combination.

Figure 3:
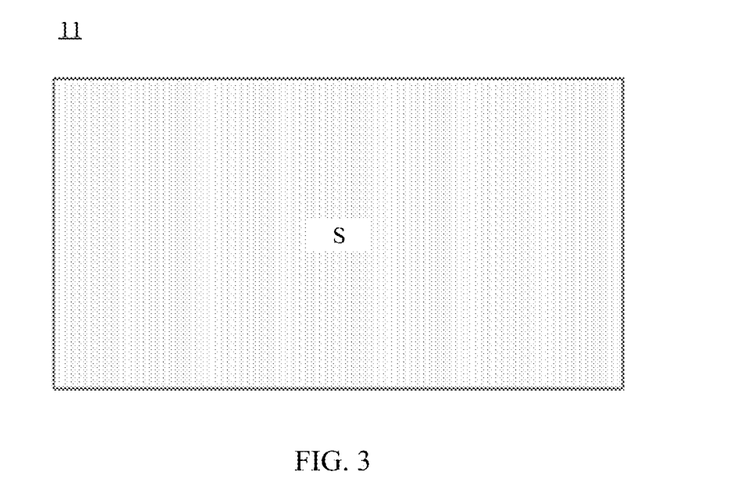
FIG. 3 is a schematic diagram of a plane of a backlight component.

As shown in FIG. 3, the backlight component 11 can generate the polarized light S.

Figure 4:
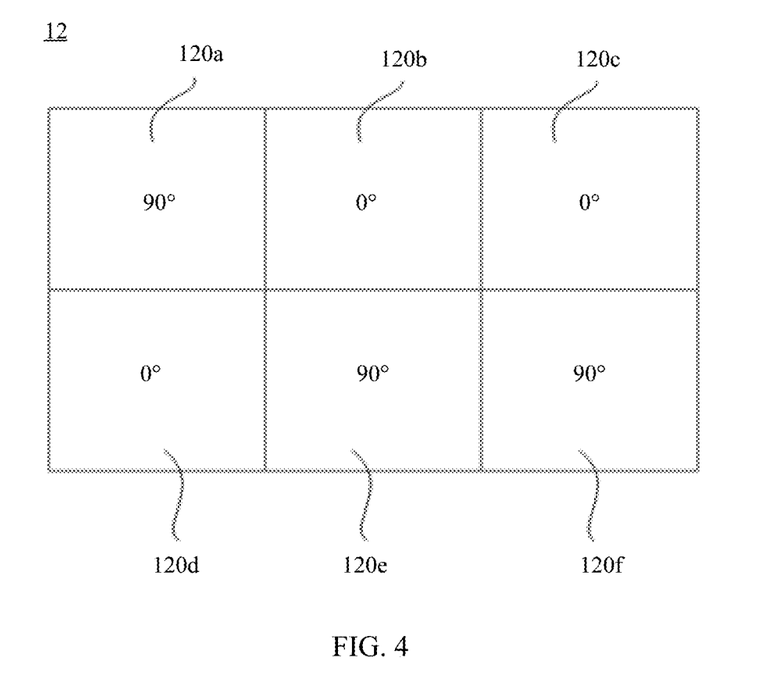
FIG. 4 is a schematic diagram of a plane of a light adjusting component.

As shown in FIG. 4, six light adjusting units are disposed in the light adjusting component 12. A light adjusting unit 120b, a light adjusting unit 120c, and a light adjusting unit 120d do not deflect polarized light. A light adjusting unit 120a, a light adjusting unit 120e, and a light adjusting unit 120f are configured to deflect a polarization direction of polarized light by 90°.

Figure 5:
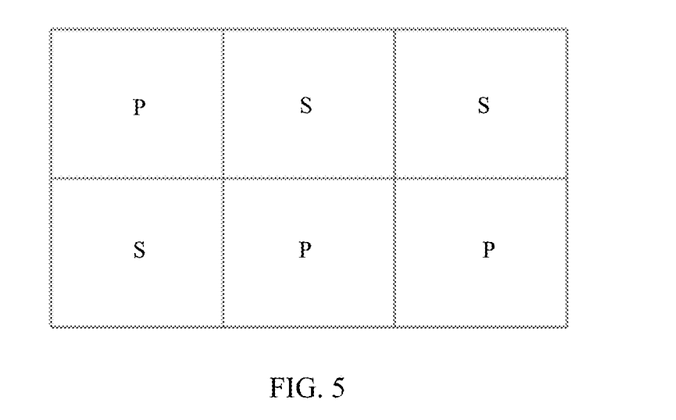
FIG. 5 is a schematic diagram of plane distribution of polarized light passing through a light adjusting component.

Referring to FIG. 5 in combination, after the polarized light S of the backlight component 11 passes through the light adjusting unit 120b, the light adjusting unit 120c, and the light adjusting unit 120d, transmitted light is still the polarized light S. When the polarized light S of the backlight component 11 passes through the light adjusting unit 120a, the light adjusting unit 120e, and the light adjusting unit 120f, transmitted light turns to the polarized light P.

Figure 6:
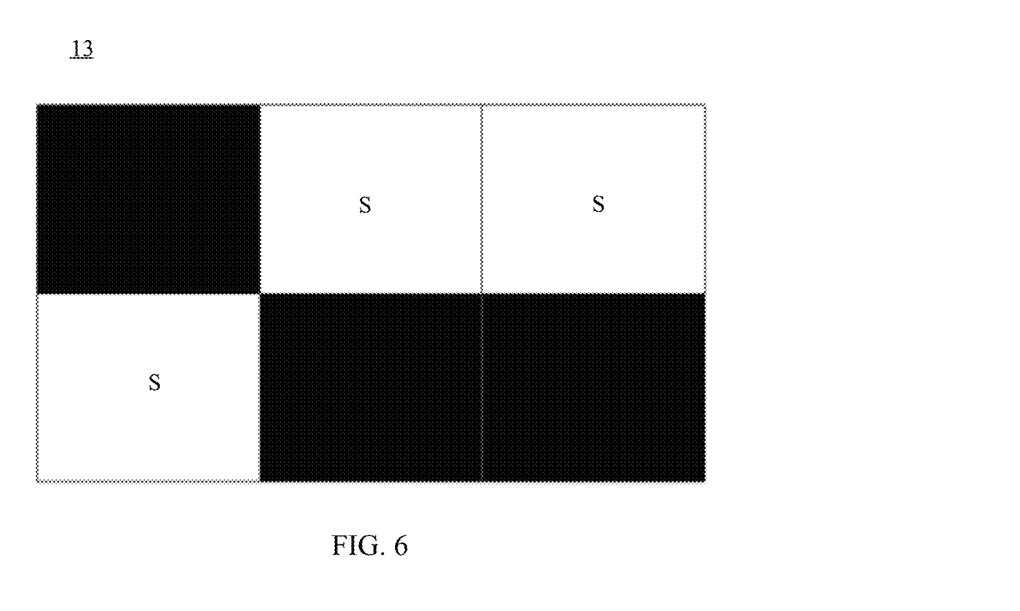
FIG. 6 is a schematic diagram of plane distribution of polarized light transmitted to a display panel.

FIG. 6 shows brightness distribution of polarized light transmitted to the display panel 13. When the polarized light S and the polarized light P pass through the first polarizing film 14, because the transmission direction of the first polarizing film 14 is consistent with the vibration direction of the polarized light S, and the transmission direction of the first polarizing film 14 and the vibration direction of the polarized light P are perpendicular to each other, the polarized light S can be effectively transmitted from an area that is of the first polarizing film 14 and that corresponds to the light adjusting unit 120b, the light adjusting unit 120c, and the light adjusting unit 120d, and the polarized light P is effectively blocked by an area that is of the first polarizing film 14 and that corresponds to the light adjusting unit 120a, the light adjusting unit 120e, and the light adjusting unit 120f.

In an embodiment, a plurality of pixel units may be configured in the display panel 13, and a quantity of light adjusting units may be the same as a quantity of pixel units. That is, the plurality of light adjusting units are disposed in one-to-one correspondence with the plurality of pixel units, and each light adjusting unit may actively adjust light transmitted to a corresponding pixel unit, to effectively control an amount of light entering the pixel unit. Alternatively, in some other implementations, a single light adjusting unit may be configured corresponding to a plurality of pixel units. Specifically, a plurality of pixel units may be disposed in an area corresponding to a single light adjusting unit, so that the single light adjusting unit can effectively control an amount of light entering the plurality of corresponding pixel units.

When disposed, a structure of the light adjusting component 12 may be in various forms.

Figure 7:
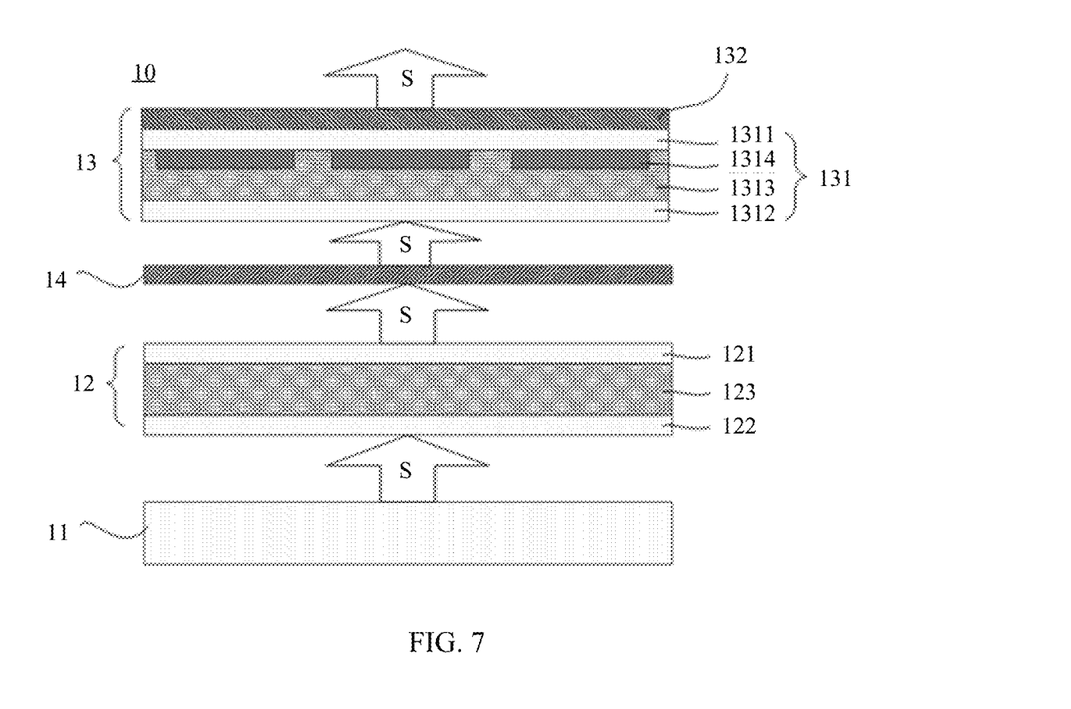
FIG. 7 is a schematic diagram of a cross-sectional structure of another display apparatus according to an embodiment of this application.

For example, as shown in FIG. 7, in an embodiment provided in this application, the light adjusting component 12 includes a first substrate 121, a second substrate 122, a liquid crystal layer 123, and a driving circuit (not shown in the figure). In an embodiment, the first substrate 121 is disposed opposite to the second substrate 122, the liquid crystal layer 123 is disposed between the first substrate 121 and the second substrate 122, and the driving circuit is disposed on the first substrate 121, and configured to drive deflection of liquid crystals in the liquid crystal layer 123 to deflect the vibration direction of the polarized light. During specific configuration, the driving circuit may include a thin film transistor, a storage capacitor, and the like. It may be understood that the driving circuit may be disposed on the first substrate 121 or the second substrate 122, or may be disposed on both the first substrate 121 and the second substrate 122.

A surface that is of each of the first substrate 121 and the second substrate 122 and that faces the liquid crystal layer 123 is provided with an alignment film (not shown in the figure), and arrangement of liquid crystal molecules in the liquid crystal layer 123 is determined based on the upper and lower alignment films when no voltage is applied from the driving circuit. Specifically, when an angle difference between the upper and lower alignment films is 90°, the arrangement of the liquid crystal molecules automatically rotates 90 degrees from top to bottom. When the polarized light passes through the liquid crystal layer 123, because the liquid crystal molecules rotate 90° in total, after the polarized light passes through the liquid crystal layer 123, the vibration direction of the polarized light is rotated 90° by the liquid crystal layer. When the driving circuit applies a voltage to the liquid crystal layer 123, arrangement directions of the liquid crystal molecules tend to be parallel to an electric field direction, so that the arrangement directions of the liquid crystal molecules tend to be arrangement towards a same direction, or an overall rotation direction of the liquid crystal molecules is less than 90°. When the polarized light passes through the liquid crystal layer 123, the vibration direction of the polarized light is not changed, or a deflection angle of the vibration direction is less than 90°.

Correspondingly, when the angle difference between the upper and lower alignment films is 0°, the arrangement of the liquid crystal molecules is at the same angle as that of the upper and lower alignment films. When the polarized light passes through the liquid crystal layer 123, the polarized light is not deflected. When the driving circuit applies a voltage to the liquid crystal layer 123, the arrangement directions of the liquid crystal molecules are deflected. When a rotation angle of the liquid crystal molecules tends to be 90°, after the polarized light passes through the liquid crystal layer 123, the vibration direction of the polarized light is rotated 90° by the liquid crystal layer 123. When the rotation direction of the liquid crystal molecules is less than 90°, after the polarized light passes through the liquid crystal layer 123, a deflection angle of the vibration direction of the polarized light is less than 90°.

It may be understood that in the foregoing embodiment, the liquid crystal molecules change the vibration direction of the polarized light by rotating in a horizontal direction (a direction parallel to a third substrate). In another implementation, a deflection direction of the liquid crystal molecules may be vertical (e.g., a direction perpendicular to the third substrate) or three-dimensional like cholesteric liquid crystals. That is, a specific type of the display panel is not limited in this application. During manufacturing, the first substrate 121 and the second substrate 122 may be made of a soft material. For example, the first substrate 121 and the second substrate 122 may be made of colorless polyimide (CPI), polyimide (PI), tricarboxylic acid cycle (TAC), polycarbonate (PC), polyethylene terephthalate (PET), or materials with a low optical phase retardation (e.g., Rth<300 nm). In addition, roughness processing may be performed on a surface of the first substrate or the second substrate to effectively prevent a phenomenon such as moire, while effectively reducing a weight of the light adjusting component 12. It may be understood that, in another implementation, the first substrate 121 and the second substrate 122 may use a same material or different materials.

For example, the first substrate 121 and the second substrate 122 may be made of materials with different refractive indices, to improve light transmittance of the light adjusting component 12.

Figure 8:
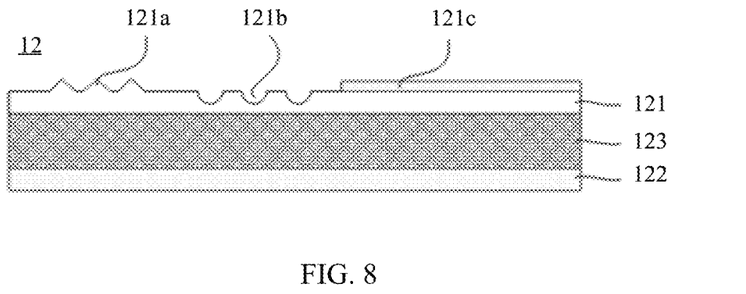
FIG. 8 is a schematic diagram of a cross-sectional structure of a light adjusting component according to an embodiment of this application.

Alternatively, as shown in FIG. 8, any one of a protrusion 121a, a groove 121b, or an antireflection film 121c may be disposed on a surface (e.g., an upper surface in the figure) that is of the first substrate 121 and that is away from the liquid crystal layer 123, to improve the light transmittance of the light adjusting component 12.

In another embodiment, alternatively, any one of the protrusion 121a, the groove 121b, or the antireflection film 121c may be disposed on a surface that is of the second substrate 122 and that is away from the liquid crystal layer 123. Alternatively, the protrusion 121a, the groove 121b, or the antireflection film 121c may be disposed on both the first substrate 121 and the second substrate 122.

In an embodiment, the display panel 13 may be a liquid crystal display panel 13.

As shown in FIG. 7, in an embodiment provided in this application, the display panel 13 includes a panel body 131 and a second polarizing film 132. The panel body 131 includes a third substrate 1311, a fourth substrate 1312, a liquid crystal layer 1313, a color filter 1314, and a driving circuit (not shown in the figure). In an embodiment, the third substrate 1311 is disposed opposite to the fourth substrate 1312, the liquid crystal layer 1313 is disposed between the third substrate 1311 and the fourth substrate 1312, and the driving circuit is disposed on the third substrate 1311, and configured to drive deflection of liquid crystals in the liquid crystal layer 1313 to deflect the vibration direction of the polarized light. In an embodiment, the driving circuit may include a thin film transistor, a storage capacitor, and the like. It may be understood that the driving circuit may be disposed on the third substrate 1311 or the fourth substrate 1312, or may be disposed on both the third substrate 1311 and the fourth substrate 1312.

The color filter 1314 is disposed on the third substrate 1311, and after the polarized light passes through the liquid crystal layer 1313, the color filter 1314 filters the light, so that the display panel 13 displays a color picture. It may be understood that, in another implementation, the color filter 1314 may alternatively be disposed on the fourth substrate 1312.

The second polarizing film 132 is disposed on a surface that is of the third substrate 1311 and that is away from the liquid crystal layer 1313, and configured to transmit polarized light whose vibration direction is consistent with a transmission direction of the second polarizing film.

To facilitate understanding of a display principle of the display apparatus 10, two picture display effects, namely, a bright state and a dark state, are described in detail below.

First, it should be noted that the vibration direction of the polarized light S is consistent with transmission directions of the first polarizing film 14 and the second polarizing film 132, and the vibration directions of the polarized light S and the polarized light P are perpendicular to each other.

As shown in FIG. 7, when the display apparatus 10 displays a bright state picture, the backlight component 11 generates the polarized light S (it is assumed that a proportion of the polarized light S is 100%), and when the polarized light S passes through the light adjusting component 12, the light adjusting component 12 does not deflect the vibration direction of the polarized light S. Because the vibration direction of the polarized light S is consistent with the transmission direction of the first polarizing film 14, the polarized light S can be effectively transmitted out of the first polarizing film 14. When the polarized light S passes through the display panel 13, the liquid crystal layer in the display panel 13 does not deflect the vibration direction of the polarized light S. Because the vibration direction of the polarized light S is consistent with the transmission direction of the second polarizing film 132, the polarized light S can be effectively transmitted out of the second polarizing film 132. In this process, because neither the first polarizing film 14 nor the second polarizing film 132 effectively blocks the polarized light S generated by the backlight component 11, the display apparatus 10 finally displays a bright state picture.

Figure 9:
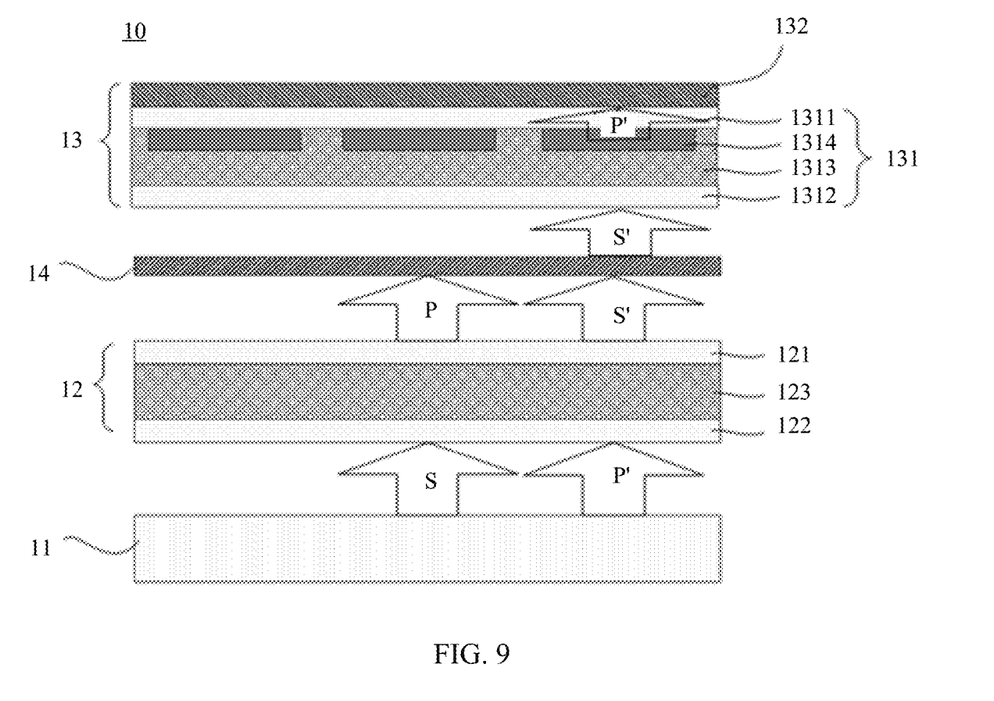
FIG. 9 is a schematic diagram of a cross-sectional structure of another light adjusting component according to an embodiment of this application.

As shown in FIG. 9, when the display apparatus 10 displays a dark state picture, the backlight component 11 generates the polarized light S, and when the polarized light S passes through the light adjusting component 12, the light adjusting component 12 deflects the vibration direction of the polarized light S by 90°, so that the polarized light S is converted into the polarized light P. When the polarized light P passes through the first polarizing film 14, because the vibration direction of the polarized light P and the transmission direction of the first polarizing film 14 are perpendicular to each other, the first polarizing film 14 effectively blocks the polarized light P, and therefore the display panel 13 does not receive effective light, so that a good dark state display effect can be achieved. In an actual situation, the polarized light generated by the backlight component 11 includes a part of stray light P' in addition to the polarized light S (vibration directions of the stray light P' and the polarized light P are the same). Therefore, a small amount of stray light P' enters the light adjusting component 12. When the stray light P' generated by the backlight component 11 passes through the light adjusting component 12, the vibration direction of the stray light P' is deflected by 90° under an action of the light adjusting component 12, that is, the stray light P' is converted into stray light S' (a vibration direction of the stray light S' is the same as the vibration direction of the polarized light S). Because the vibration direction of the stray light S' is the same as the transmission direction of the first polarizing film 14, this part of stray light S' is transmitted to the display panel 13. In this case, the liquid crystal layer 1313 in the display panel 13 deflects the vibration direction of the stray light S' by 90° to convert the stray light S' into the stray light P' (the vibration directions of the stray light P' and the polarized light P are the same). Because the vibration direction of the stray light P' and the transmission direction of the second polarizing film 132 are perpendicular to each other, the second polarizing film 132 effectively blocks the stray light P'. In this process, because the first polarizing film 14 effectively blocks the polarized light P and the second polarizing film 132 effectively blocks the stray light P', the display apparatus 10 finally displays a dark state picture.

It may be understood that, in another embodiment, the transmission directions of the first polarizing film 14 and the second polarizing film 132 may be perpendicular to each other. Alternatively, the vibration direction of the polarized light S generated by the backlight component 11 and the transmission direction of the first polarizing film 14 may be perpendicular to each other. Correspondingly, when processing the polarized light, the liquid crystal layer 123 in the light adjusting component 12 and the liquid crystal layer 1313 in the display panel 13 may deflect the polarization direction of the polarized light based on a display effect that needs to be displayed. In addition, in terms of structure disposition, the first polarizing film 14 may be attached to a surface (a lower surface in the figure) that is of the fourth substrate 1312 and that is away from the liquid crystal layer 1313. Alternatively, the first polarizing film 14 may be attached to a surface (e.g., an upper surface in the figure) that is of the first substrate 121 and that is away from the liquid crystal layer 123. This is not specifically limited in this application.

In addition, in an embodiment, during specific disposition, a specific gap is maintained between the display panel 13 and the light adjusting component 12 to prevent an undesirable phenomenon such as moire. A width of the gap may be maintained as 0.5 µm or more. Alternatively, in another implementation, the display panel 13 may be attached to the light adjusting component 12. For example, an adhesive layer with a specific thickness may be disposed between the display panel 13 and the light adjusting component 12, to fixedly attach the display panel 13 to the light adjusting component 12.

Figure 10:
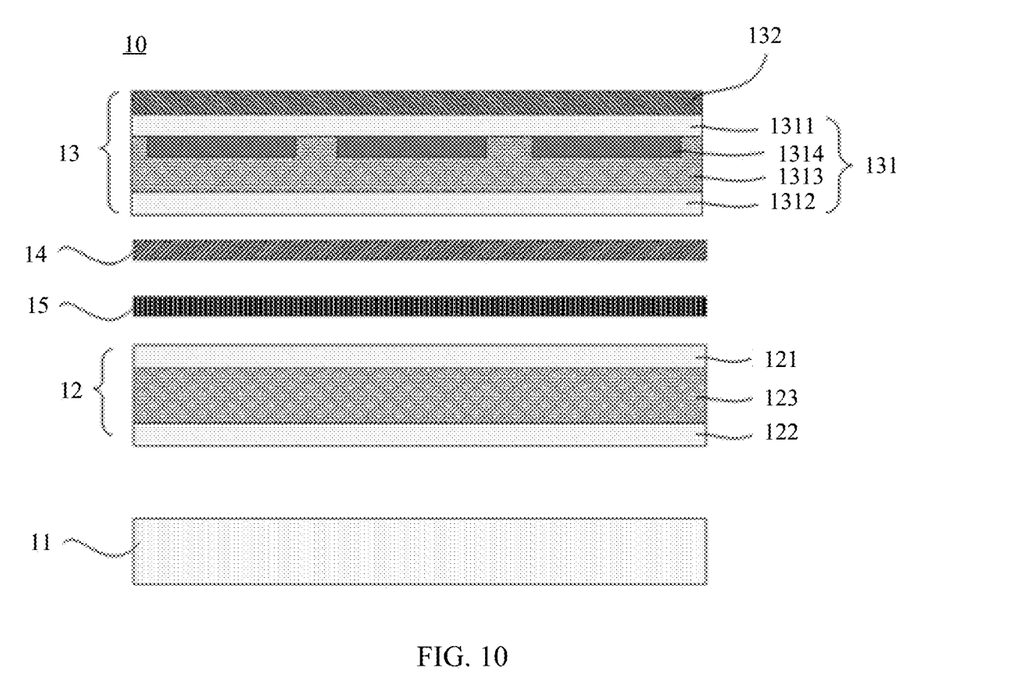
FIG. 10 is a schematic diagram of a cross-sectional structure of still another light adjusting component according to an embodiment of this application.

As shown in FIG. 10, to improve a display effect of the display apparatus 10 and prevent an undesirable phenomenon such as moire, a diffusion film 15 may be further disposed between the display panel 13 and the light adjusting component 12. The diffusion film 15 can improve field-of-view distribution of the polarized light, while effectively maintaining the original vibration direction of the polarized light. For example, the diffusion film 15 can increase a field of view of the polarized light by more than 10°, and can maintain the vibration direction of the polarized light at more than 90%.

In an embodiment, the diffusion film 15 may be disposed between the first polarizing film 14 and the first substrate 121, or may be disposed between the first polarizing film 14 and the fourth substrate 1312. In addition, the diffusion film 15 may be made of a material such as polycarbonate or polyimide, and a thickness of the diffusion film 15 may be adaptively adjusted based on an actual situation. This is not limited in this application.

It should be noted that, for ease of understanding the technical solutions of this application, the foregoing embodiment is described by using an example in which the polarized light is linearly polarized light, and both the first polarizing film 14 and the second polarizing film 132 are linearly polarizing films. It may be understood that in another implementation, the technical solutions are still applicable when the polarized light is circularly polarized light or elliptically polarized light, the first polarizing film 14 is a circularly polarizing film, and the second polarizing film 132 is a circularly polarizing film. For example, when the polarized light generated by the backlight component 11 is circularly polarized light, both the first polarizing film 14 and the second polarizing film 132 may be linearly polarizing films, or both the first polarizing film 14 and the second polarizing film 132 may be circularly polarizing films.

In addition, to improve a display effect of the display apparatus 10, a polarization rate of light generated by the backlight component 11 may be greater than or equal to 75%. That is, in the light generated by the backlight component 11, a proportion of polarized light having a same vibration direction is greater than or equal to 75% (for example, a proportion of the polarized light S is greater than or equal to 75%, and a proportion of the polarized light P' is less than or equal to 25%).

In actual application, the display apparatus 10 not only has an image display function, but also can implement human-machine interaction.

Figure 11:
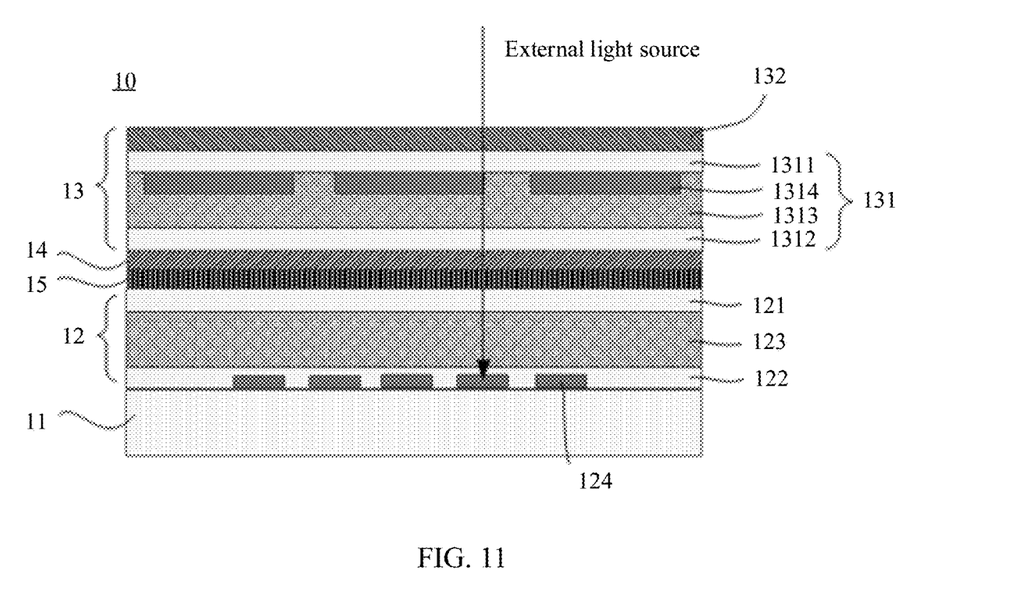
FIG. 11 is a schematic diagram of a cross-sectional structure of still another light adjusting component according to an embodiment of this application.

As shown in FIG. 11, in an embodiment provided in this application, the light adjusting component 12 is further provided with a photoelectric element 124 (five are shown in the figure). When an external light source (such as an infrared laser pen used by a user) irradiates the display apparatus 10, the external light source is transmitted to the light adjusting component 12 through the display panel 13 and the first polarizing film 14. After the photoelectric element 124 senses the external light source, a specific irradiation position of the external light source may be determined, to achieve the objective of human-machine interaction. During specific implementation, one photoelectric element 124 may be disposed in each light adjusting unit of the light adjusting component 12, to effectively improve precision of the irradiation position of the external light source.

In an embodiment, the photoelectric element 124 may be disposed on the first substrate 121 or the second substrate 122, or may be disposed on both the first substrate 121 and the second substrate 122. The photoelectric element 124 may be a photosensitive resistor, a photosensitive diode, a photosensitive triple laser, or the like.

In addition, the backlight component 11 may also be specifically disposed with various structures.

For example, the backlight component 11 may use a side-illumination type backlight design, or may use a direct-type backlight disposition.

Figure 12:
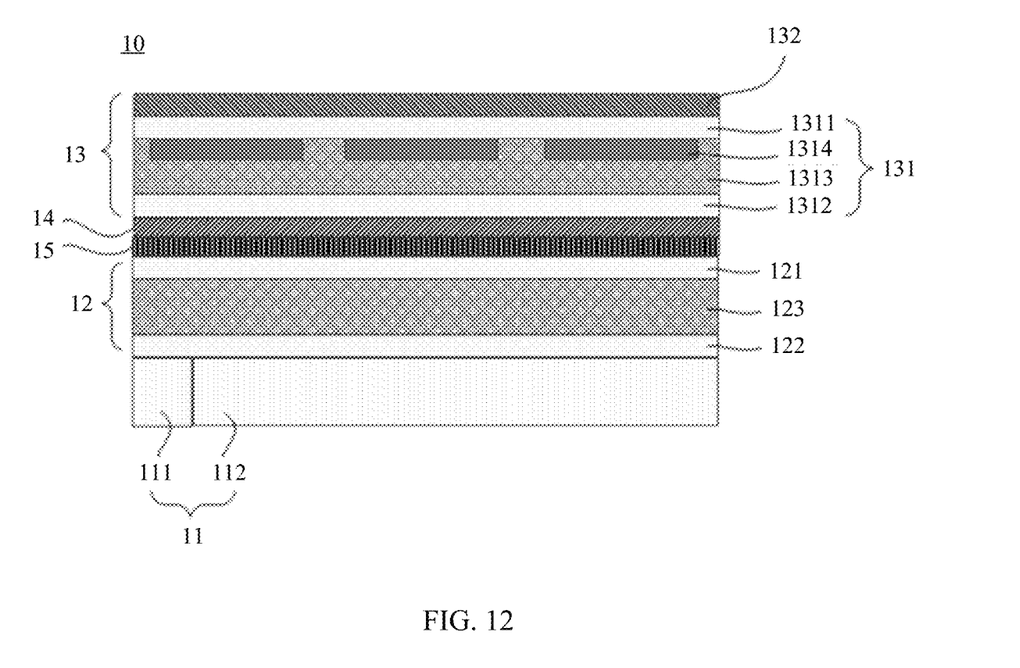
FIG. 12 is a schematic diagram of a cross-sectional structure of still another light adjusting component according to an embodiment of this application.

As shown in FIG. 12, in an embodiment, when the backlight component 11 uses the side-illumination type backlight design, the backlight component 11 may include a side light source 111 and a light guide plate 112, to form an area light source on a side of the light adjusting component 12. A quantity and positions of configured side light sources 111 may be properly adjusted based on an actual requirement. For example, the side light source 111 may be disposed on only one side edge (a left side in the figure), and one or more side light sources 111 may be disposed (one is shown in the figure).

Figure 13:
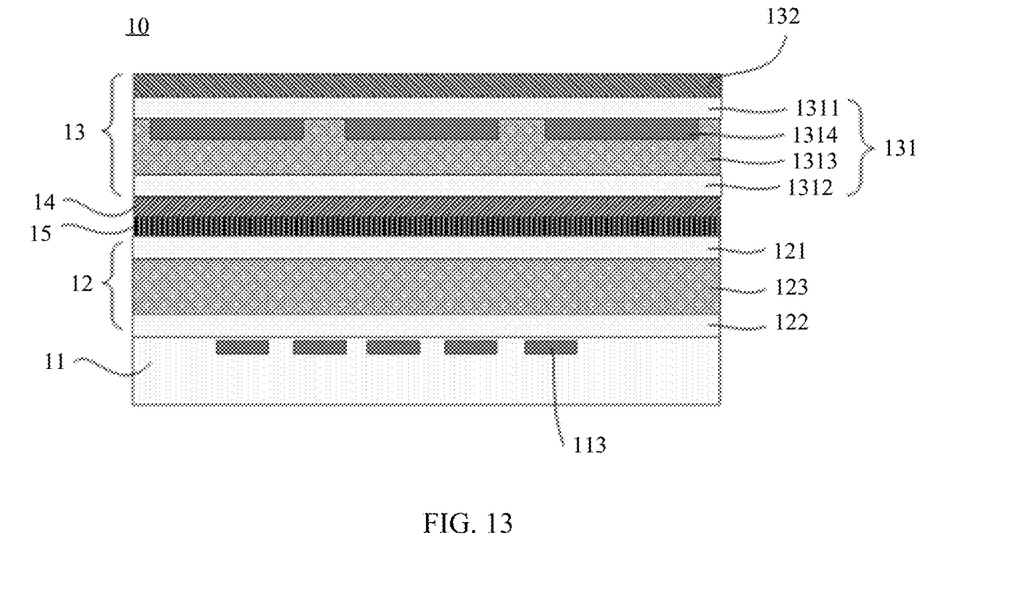
FIG. 13 is a schematic diagram of a cross-sectional structure of still another light adjusting component according to an embodiment of this application.

As shown in FIG. 13, when the backlight component 11 uses the direct-type design, the backlight component 11 may include a plurality of point light sources 113 (five are shown in the figure). A component of the point light source 113 may specifically be a light emitting diode, and the plurality of point light sources 113 may be disposed in an array. During specific disposition, a single point light source 113 may constitute one backlight unit, or one backlight unit may include a plurality of point light sources. For example, one backlight unit may include 2*2 point light sources, or one backlight unit may include 3*4 point light sources.

Figure 14:
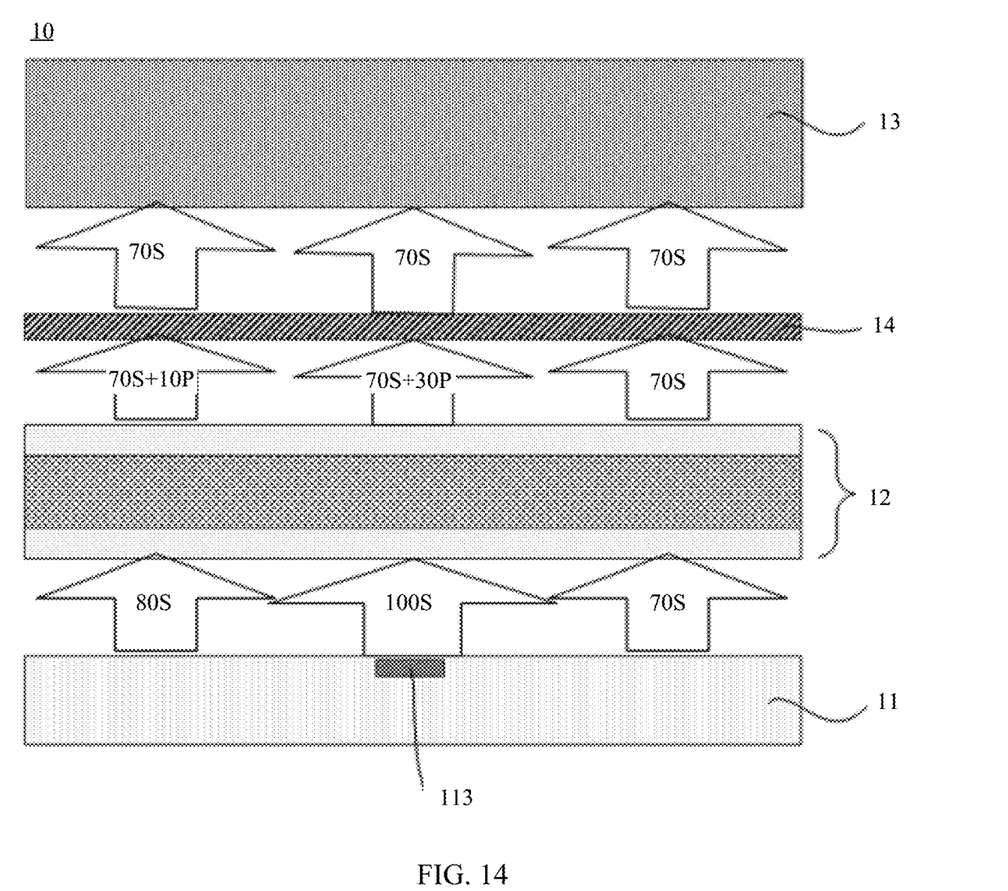
FIG. 14 is a schematic diagram of a cross-sectional structure of still another light adjusting component according to an embodiment of this application.

In addition, in an embodiment provided in this application, the light adjusting component 12 may further perform uniformization processing on the light of the backlight component 11, to improve a display effect of the display apparatus 10.

As shown in FIG. 14, light emitted by the point light source 113 is not uniform, that is, light intensity at a center position of the point light source 113 is higher, while light intensity in a peripheral area of the point light source 113 is weaker. For example, a center area of the point light source 113 can generate 100% polarized light S, a left area can generate 80% polarized light S, and a right area can generate 70% polarized light S. Therefore, to enable the display panel 13 to receive polarized light with uniform light intensity, a part that is of the light adjusting component 12 and that corresponds to the central area of the point light source 113 may deflect a vibration direction of the polarized light. Deflected polarized light may be decomposed into 70% polarized light S and 30% polarized light P. Correspondingly, a part that is of the light adjusting component 12 and that corresponds to the left area of the point light source 113 may deflect a vibration direction of the polarized light S. Deflected polarized light may be decomposed into 70% polarized light S and 10% polarized light P. A part that is of the light adjusting component 12 and that corresponds to the right area of the point light source 113 does not deflect a vibration direction of the polarized light S. The vibration directions of the polarized light S and the polarized light P are perpendicular to each other, and the transmission direction of the first polarizing film 14 is consistent with the vibration direction of the polarized light S. Because the first polarizing film 14 can transmit the polarized light S and block the polarized light P, the display panel 13 receives 70% polarized light S. That is, different areas (e.g., light adjusting units) of the light adjusting component 12 may independently adjust the polarized light of the backlight component 11, so that the display panel 13 can receive an area light source with uniform light intensity.

In addition, an embodiment of this application further provides an electronic device, including a housing and the foregoing display apparatus 10. The display apparatus 10 is installed in the housing. Specifically, "the display apparatus 10 is installed in the housing" may be as follows. The housing may be provided with an accommodation groove for fixedly installing the display apparatus 10. After the display apparatus 10 is fixedly installed in the accommodation groove, the display panel 13 can be exposed out of an outer surface of the housing. During specific implementation, the electronic device may be a display, a television, a mobile phone, a notebook computer, a smart watch, or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A display apparatus, comprising:
   a backlight component configured to generate polarized light;
   a light adjusting component disposed on one side of the backlight component, and configured to deflect a vibration direction of the polarized light;
   a display panel disposed on one side of the light adjusting component, wherein the light adjusting component is located between the backlight component and the display panel; and
   a first polarizing film disposed between the light adjusting component and the display panel, and configured to transmit polarized light whose vibration direction is the same as a transmission direction of the first polarizing film.

2. The display apparatus according to claim 1, wherein the light adjusting component comprises:
   a first substrate;
   a second substrate disposed opposite to the first substrate;
   a liquid crystal layer disposed between the first substrate and the second substrate; and a driving circuit disposed on the first substrate and/or the second substrate, and configured to drive deflection of liquid crystals in the liquid crystal layer to deflect the vibration direction of the polarized light.

3. The display apparatus according to claim 2, wherein refractive indexes of the first substrate and the second substrate are different.

4. The display apparatus according to claim 2, wherein a protrusion, a groove, or an antireflective film is disposed on a surface of the first substrate and away from the liquid crystal layer.

5. The display apparatus according to claim 2, wherein a protrusion, a groove, or an antireflective film is disposed on a surface of the second substrate and away from the liquid crystal layer.

6. The display apparatus according to claim 2, wherein the light adjusting component further comprises a photoelectric element disposed in the first substrate or the second substrate, and is configured to sense an optical signal transmitted from one side of the display panel.

7. The display apparatus according to claim 2, wherein the display panel comprises a panel body and a second polarizing film, wherein the second polarizing film is disposed on a side of the panel body and away from the first polarizing film.

8. The display apparatus according to claim 1, further comprising a diffusion film disposed between the light adjusting component and the first polarizing film, or between the display panel and the first polarizing film.

9. The display apparatus according to claim 1, wherein the display panel comprises a plurality of pixel units, and the light adjusting component comprises a plurality of light adjusting units; and
a quantity of the light adjusting units is less than or equal to a quantity of the pixel units.

10. The display apparatus according to claim 9, wherein a plurality of backlight units are configured for the backlight component; and
a quantity of the backlight units is less than a quantity of the light adjusting units.

11. An electronic device, comprising:
a housing; and
a display apparatus disposed in the housing, wherein the display apparatus comprises:
a backlight component configured to generate polarized light;
a light adjusting component disposed on one side of the backlight component, and configured to deflect a vibration direction of the polarized light;
a display panel disposed on one side of the light adjusting component, wherein the light adjusting component is located between the backlight component and the display panel; and
a first polarizing film disposed between the light adjusting component and the display panel, and configured to transmit polarized light whose vibration direction is the same as a transmission direction of the first polarizing film.

12. The electronic device according to claim 11, wherein the light adjusting component comprises:
a first substrate;
a second substrate disposed opposite to the first substrate;
a liquid crystal layer disposed between the first substrate and the second substrate; and
a driving circuit disposed on the first substrate and/or the second substrate, and configured to drive deflection of liquid crystals in the liquid crystal layer to deflect the vibration direction of the polarized light.

13. The electronic device according to claim 12, wherein refractive indexes of the first substrate and the second substrate are different.

14. The electronic device according to claim 12, wherein a protrusion, a groove, or an antireflective film is disposed on a surface of the first substrate and away from the liquid crystal layer.

15. The electronic device according to claim 12, wherein a protrusion, a groove, or an antireflective film is disposed on a surface of the second substrate and away from the liquid crystal layer.

16. The electronic device according to claim 12, wherein the light adjusting component further comprises a photoelectric element disposed in the first substrate or the second substrate, and is configured to sense an optical signal transmitted from one side of the display panel.

17. The electronic device according to claim 12, wherein the display panel comprises a panel body and a second polarizing film, wherein the second polarizing film is disposed on a side of the panel body and away from the first polarizing film.

18. The electronic device according to claim 11, wherein the display apparatus further comprises a diffusion film disposed between the light adjusting component and the first polarizing film, or between the display panel and the first polarizing film.

19. The electronic device according to claim 11, wherein the display panel comprises a plurality of pixel units, and the light adjusting component comprises a plurality of light adjusting units; and
a quantity of the light adjusting units is less than or equal to a quantity of the pixel units.

20. The electronic device according to claim 19, wherein a plurality of backlight units are configured for the backlight component; and a quantity of the backlight units is less than a quantity of the light adjusting units.

* * * * *